G. L. DODDS.
FARM IMPLEMENT.
APPLICATION FILED MAY 9, 1914.
1,147,079.
Patented July 20, 1915.
2 SHEETS—SHEET 2.
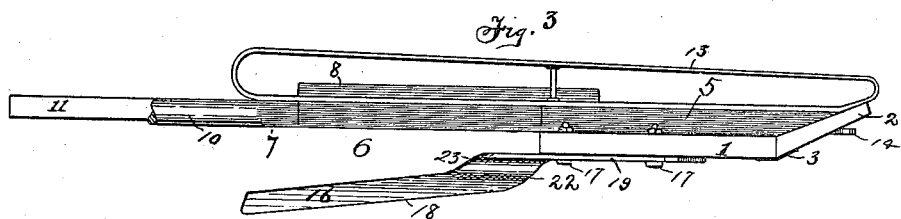
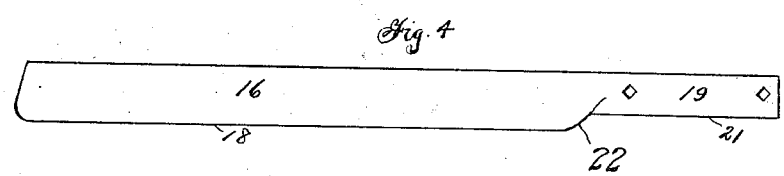
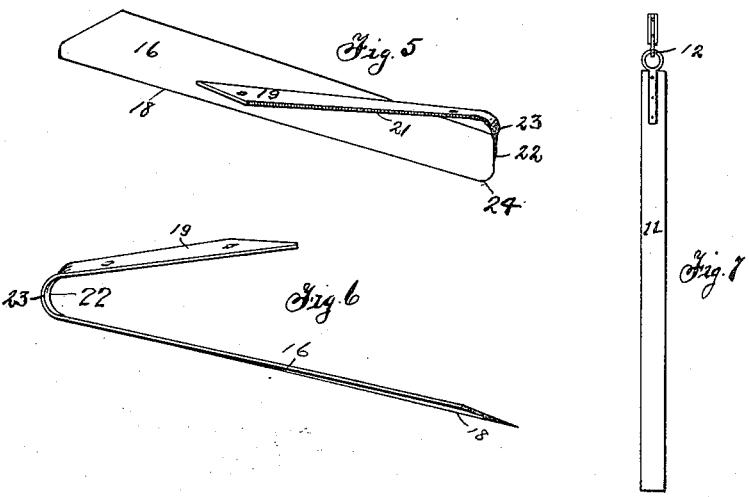
Witnesses
L. Chambers.
J. B. MacKay
Inventor
George Livingstone Dodds
By D. P. Meal
His Attorney

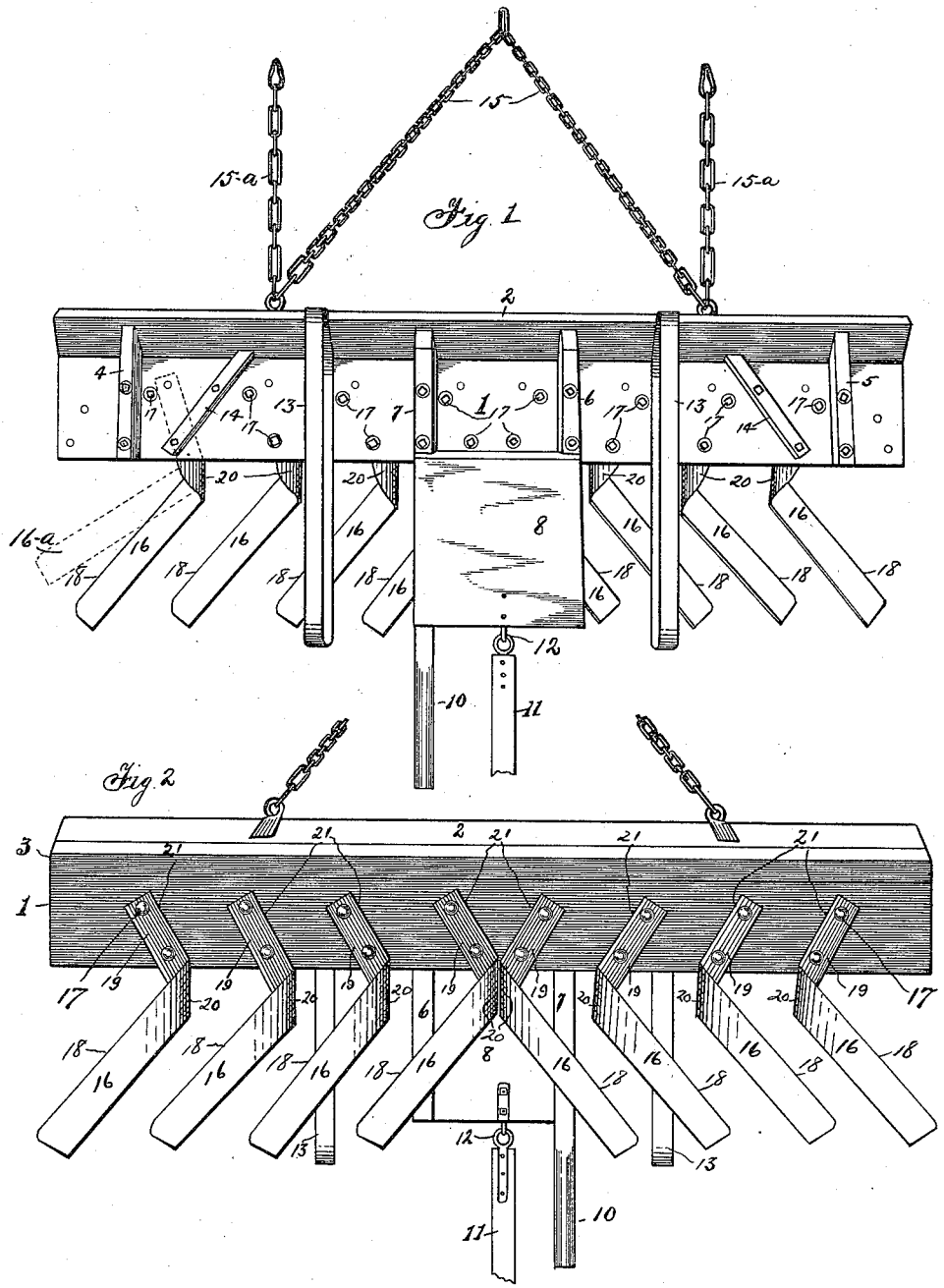

UNITED STATES PATENT OFFICE.

GEORGE LIVINGSTONE DODDS, OF WINNIPEG, MANITOBA, CANADA.

FARM IMPLEMENT.

1,147,079. Specification of Letters Patent. Patented July 20, 1915.

Application filed May 9, 1914. Serial No. 837,428.

*To all whom it may concern:*

Be it known that I, GEORGE LIVINGSTONE DODDS, citizen of the Dominion of Canada, residing at the city of Winnipeg, in the Province of Manitoba, Dominion of Canada, have invented certain new and useful Improvements in Farm Implements, of which the following is a specification.

My invention relates to the cultivator class, and has for its object the production of an implement of this type particularly adapted for the destruction of Canadian, Russian and sow thistles and other noxious weeds, and which is of great value in dry farming operations by reason of its ability to produce a superficial dust mulch by which the natural moisture of the earth is conserved to the best advantage, and the draw backs to which this class of farming is subjected through uncertain or scanty rainfall, are avoided.

The objects of the invention are obtained by the means fully set forth in the following specification and illustrated in the drawings which form a part hereof, and in which similar numerals refer to similar parts throughout the different views.

Referring to these, Figure 1 is a plan view of an implement embodying my invention, Fig. 2 is a view of the underside of the implement, Fig. 3 is an end view, Fig. 4 is a view of one of the blades before bending, Fig. 5 is a front view in perspective of one of the blades, Fig. 6 is a rear view of the same, Fig. 7 is the support used when it is necessary to clear the blades of obstructing matter.

In the different views 1 indicates the main part of the supporting frame, preferably a plank of wood of a length suitable to the size of the implement contemplated. This may run from four to twelve or more feet in length according to the nature of the work for which it is intended. In plantations where canes or trees are set in rows, and the object is to cultivate the space between, the implement would naturally be constructed to suit the distance between the rows, thus limiting its length.

To the front edge of the part 1 is secured the part 2, preferably also of wood and extending the full length of the part 1. The part 2 projects upward and forward in lip fashion at such an angle as is best calculated to assist the part 1 to surmount and pass such minor obstacles as may be met with in passing over comparatively smooth ground.

3 indicates a sheet of metal secured to underside of the implement, covering the junction of the parts 1 and 2, and adapted to resist the wear which would naturally occur at this point due to the dragging of the implement over the ground. Blocks 4 and 5 are secured to the upper side of the part 1 and to the part 2 serving to maintain the disposition of the one to the other. The bars 6 and 7 are also secured to both parts and assist in maintaining the shape of the frame.

The ends of the bars 6 and 7 extend out behind the frame 1 and carry on their upper sides a platform 8 upon which the operator may stand or which may support a seat. The end of the bar 7 it will be noted projects still farther behind the platform 8 and is rounded to form a handle 10 by means of which the rear of the implement may be raised from the ground when it becomes necessary to clear the blades from obstructions such as stubble, roots, and similar clinging matter.

11 indicates a leg loosely secured to the end of the platform 8 and adapted to support the implement in its raised position while the blades are being cleared. The leg 11 is preferably secured to the platform 8 by means of the linked connection 12 which forms a suitably flexible medium, allowing the leg 11 to trail along the ground behind the implement when not in use.

13—13 are runners secured to the upper sides of the parts 1 and 2, and upon which the implement may be overturned and drawn from place to place, when inoperative transport is desired.

14—14 are draw bars disposed as shown and bolted to the upper side of the frame 1. These extend out through the part 2 ending in rings or other suitable devices, by means of which a chain 15 may be secured to the implement, forming a means by which the implement may be drawn by horses or other tractive means over the ground. The draft may be arranged in such a manner that a team may draw from each of the bars 14 by the evener chains 15$^a$ or a single team may draw from the center as shown.

The blades 16 which are the vital parts of the implement, are secured to the under side of the frame 1 by bolts 17, and they may be arranged with their cutting edges 18 turned toward the center or outward as shown.

The blades or cultivator attachments 16 are formed from a single piece of metal preferably spring steel, approximately four inches wide by about thirty-two inches in length, and for descriptive purposes it may be said, that though integrally formed, each of these comprises three distinct parts viz.— an attaching portion, a bent portion, and a blade portion proper, which is beaten out to form a cutting edge on one side. The attaching portion, 19, of each attachment is that portion which lies flat against the under side of the frame 1 and through which the bolts 17 pass to secure it to the frame, the bent portion 20 is formed by the bending back of the blade portion 16 toward and across the attaching portion 19, in such manner that the front or cutting side 18 of the blade portion becomes the rear edge 21 of the attaching portion and the connecting metal 20 is left in the shape of an open bend, there being a space of approximately three or four inches between the under face of the attaching portion and the upper face of the blade portion at the curve.

The bending of the attachment when finished is distinctly novel in the following particular: When the attachment is secured to the underside of the frame 1 as shown in the drawings, the frame 1 being in a level position, the blade portion 16 dips from rear to cutting edge at an angle of approximately 45 degrees. The front edge 22 (Figs. 3, 4, 5 and 6) of the bent portion stands up perpendicularly with a gouge shaped lip 24 connecting it with the blade proper, while the rear edge 23 describes a semi-circular curve. As shown in the drawings, the cultivator attachments are bolted to the under side of the frame 1 in such manner that the blades 16 extend diagonally away from the rear, the side of the bent portion 20 of each standing substantially at right angles to the longitudinal direction of the frame 1 and the blades are so spaced as to overlap each other to a certain extent to insure the even treatment of all the soil covered by the implement.

It will be understood that as the depth or perpendicular diameter of the bent portion of the cultivator attachments regulates the distance to which the blades will enter the ground, and that as the front edges of these, as also the edges 22 of the bent portion, have been ground to a reasonable degree of sharpness the operation of the implement will be as follows: The implement being given a forward movement, owing to the peculiar shape of the bent portion of the attachment as previously described, the part 22 of the bends being practically perpendicular acts in a manner similar to that of a colter of a plow, causing the blades to enter the ground practically without resistance. The frame 1 prevents the blades from entering the ground beyond the distance predetermined, usually about 3 or 4 inches, and they are thereafter drawn along at that depth below the surface. Owing to the manner in which they are set it will be noted that the action of the blades is a forward slicing or cutting action, similar to the angle stroke of a razor upon the face, and by no means a dragging or tearing action. For this reason the draft of the implement is extremely light in proportion to its execution, and the roots of noxious weeds are evenly cut at the proper distance below the surface of the soil to insure their destruction.

As previously mentioned the rear edge of each blade is raised at an angle of about 45 degrees above the cutting edge, and the separated portion of the soil is forced to travel up the incline carrying with it the tops of the separated weeds. As the soil sifts over the rear edge of the blades, it being the heavier, it naturally falls first thus casting the weeds to the surface, when exposure of their tender parts to the air effectually kills them and prevents reseeding. The sifting of the soil over the rear edge of the blade serves to effectually disintegrate and pulverize it, thus forming a dust mulch well calculated to prevent evaporation of the moisture in the subsoil.

Scientific research has amply shown that the soil naturally contains a sufficient amount of moisture to insure a crop under almost any conditions of rainfall could the natural moisture be conserved, but unfortunately, owing to the lack of a proper implement for the purpose, the soil in most cases has been allowed to become crusted upon the surface after which it rapidly bakes and the moisture is evaporated and lost. My invention provides a ready means of breaking the crust mentioned, and only so deeply as is necessary thus preventing the baking and consequent loss of moisture, and after the first weed cutting trip over the soil has been made the blades may be shifted in the position shown by dotted blade 16ª in Fig. 1, after which the mulching process may be repeated as frequently as baking of the soil occurs.

Having thus fully described my said invention and its action, what I claim is—

1. A farm implement comprising a frame adapted to rest upon and be drawn over the surface of the ground and a plurality of members adapted to operate below the surface of the ground, each of said members having a shank portion for attachment to the frame and a portion twisted over to form neck and blade portions, the neck portion standing substantially at right angles to the shank and blade and connecting the same and the blade extending diagonally and rearwardly away from the frame and being disposed upon a downwardly inclined plane from rear to cutting edge, whereby a downward pull is exerted upon the frame to cause the same to level and pack the soil over which it passes.

2. A farm implement comprising a frame adapted to be drawn over the surface of the ground and a plurality of members adapted to operate below the surface of the ground, each of said members having a shank portion for attachment to the frame and a portion comparatively wider than the shank portion, said wider portion being twisted over to form neck and blade portions, the blade portion extending diagonally away from the rear of the frame and the neck connecting the shank and blade and having its forward and cutting edge standing substantially at right angles thereto and its rear edge describing a curve whereby the rear edge of the blade is raised above the cutting edge thereof and lodgment of separated matter in the neck prevented.

3. A farm implement comprising a frame adapted to be drawn over the surface of the ground and a plurality of members adapted to operate below the surface of the ground, each of said members having a shank portion for attachment to the frame and a portion comparatively wider than the shank portion, the wider portion being twisted over to form neck and blade portions, the blade portion extending diagonally away from the rear of the frame and the neck standing substantially at right angles to the shank and blade and connecting the same, and a gouge shaped lip formed by the neck and blade at their point of junction.

4. A farm implement comprising a frame adapted to be drawn over the ground and a plurality of members adapted to operate below the surface of the ground, each of said members having a shank portion for attachment to the frame and a portion comparatively wider than the shank portion, said wider portion being twisted over to form neck and blade portions, the blade extending diagonally away from the rear of the frame and being disposed upon an upwardly inclined plane from front to rear, the front of the neck standing substantially at right angles to the shank and forming a gouge shaped lip-like junction with the blade and the rear edge of the neck describing a curve.

In testimony whereof, I affix my signature in the presence of two witnesses.

GEORGE LIVINGSTONE DODDS.

Witnesses:
LESLIE A. DOWKER,
ALBERT C. MOARN.

Copies of this patent may be obtained for five cents each, by addressing the "Commissioner of Patents, Washington, D. C."